United States Patent

Roy et al.

Patent Number: 5,363,371
Date of Patent: Nov. 8, 1994

[54] MOBILE ISDN RADIO SYSTEM

[75] Inventors: Asim K. Roy, Naperville; Richard A. Comroe, Dundee; Robert W. Furtaw, Arlington Hts., all of Ill.

[73] Assignee: Motorola, Inc., Schaumburg, Ill.

[21] Appl. No.: 87,015

[22] Filed: Nov. 9, 1992

Related U.S. Application Data

[63] Continuation of Ser. No. 598,081, Oct. 16, 1990, abandoned.

[51] Int. Cl.⁵ .................................................. H04J 3/12
[52] U.S. Cl. ...................................... 370/79; 370/95.1; 370/110.1; 379/93
[58] Field of Search ................ 370/58.1, 58.2, 58.3, 370/62, 79, 85.4, 85.7, 94.1, 110.1; 379/93, 94, 219, 229, 231, 233, 243, 58, 59, 60, 63; 455/33.1, 38.1

[56] References Cited

U.S. PATENT DOCUMENTS

| | | | |
|---|---|---|---|
| 4,748,681 | 5/1988 | Schmidt | 370/95.1 |
| 5,001,710 | 3/1991 | Gawrys et al. | 370/110.1 |
| 5,008,884 | 4/1991 | Yazawa et al. | 370/110.1 |
| 5,034,948 | 7/1991 | Mizutani et al. | 370/79 |
| 5,040,177 | 8/1991 | Martin et al. | 370/110.1 |
| 5,046,088 | 9/1991 | Margulies | 379/231 |
| 5,067,125 | 11/1991 | Tsuchida | 370/110.1 |

Primary Examiner—Alphus H. Hsu
Attorney, Agent, or Firm—Jon P. Christensen

[57] ABSTRACT

A system is described for providing ISDN services on a PSTN to communication units from an ISDN interface within a resource controller. The communication unit is allowed access to a target such as a subscriber within the PSTN or a communication unit in another cell, in an ISDN environment through entry of a target access number. The ISDN environment may be changed by the communication unit before entry of a target ID number.

11 Claims, 3 Drawing Sheets

Microfiche Appendix Included
(189 Microfiche, 3 Pages)

MOBILE ISDN RADIO SYSTEM

This application is a file wrapper continuation of application Ser. No. 07/598,081, filed Oct. 16, 1990, now abandoned.

MICROFICHE APPENDIX

This specification includes a microfiche appendix comprising 3 microfiche and 189 frames.

COPYRIGHT INFORMATION

A portion of the disclosure of this patent contains material that is subject to copyright protection. The copyright owner has no objection to the facsimile reproduction by anyone of the patent document of the patent disclosure as it appears in the Patent and Trademark Office patent files or records, but otherwise reserves all copyright rights whatsoever.

FIELD OF THE INVENTION

This invention relates to the field of communication systems and more specifically to trunked communication systems.

BACKGROUND OF THE INVENTION

Trunked radio communication systems are known. Such systems typically allocate communication resources to communication units upon a perception of a need for service by a resource controller.

Transceivers are provided at communication system base sites to receive signals from communication units and to re-transmit the signals for the benefit of any target units present within the service coverage area of the base site. Some transceivers present at the base site are also capable of, upon occasion, providing an interconnect between the communication unit and a local public switched telephone network (PSTN).

PSTNs are also known. PSTNs offer communication services primarily over wireline based communication facilities. Services offered include basic telephone service as well as a number of auxiliary services offered independently or through integrated services digital networks (ISDNs). ISDNs, as is known, offer a variety of voice and data services.

Key to accessing ISDN services is the transmission of control characters into the PSTN system. Access to an ISDN system, and the type of service provided, is dependent upon providing the proper control words under protocols as follows: Q.931 for voice and data service, Q.932 for supplementary services, and X.25 for packet mode data servicing (for an detailed description of control of an ISDN system, refer to Bellcore—Bell Communication Research Pub. No. TR-TSY-000268 (Issue #3, May 1989)).

In the past, creation of control characters and protocols for accessing ISDN services has been under the control of a computer (or data processing equipment with an AT&T SESS switch or Northern Telecom DMS switch) or other data processing equipment connected to the PSTN network and typically under the manual control of an operator. Because of the importance of ISDN services a need exists for access to ISDN on a PSTN from other communication systems.

SUMMARY OF THE INVENTION

Pursuant to one embodiment of the invention in a communication system having a resource controller with an ISDN interface and an interconnect to a PSTN offering ISDN services, and at least one communication unit requiring communication services involving ISDN services, a method of providing communication services to the requesting communication unit is offered. The method of providing the communication services to the communication unit involves transmitting an inbound communication to a resource controller at a base site from a requesting communication unit, receiving and decoding the inbound communication at the base site to produce an ID of a target. The ID of the target is communicated to the ISDN interface, which upon occasion, determines that an access code of the target is listed in a routing table within a memory operatively coupled to the ISDN interface. The ISDN interface recovers the access code from the routing table and a set of control words specifying an ISDN environment from a look-up table. The ISDN interface then transmits the access code and set of control words over the PSTN interconnect to an ISDN network within the PSTN system.

In order for a requesting communication unit to access a target over an ISDN system the ISDN interface must first exchange information with the ISDN network relative to a communications environment. The communication environment may be created through the exchange of set-up commands with an ISDN network within the PSTN system. The set-up commands used by the ISDN interface are contained within a look-up table within the memory associated with the ISDN interface. Upon receipt of a request for access to a target over the ISDN network the ISDN interface first transmits a series of set-up commands into the ISDN network recovered from the ISDN environment look-up table.

Changes may be made to the ISDN environment look-up table by activation of a change routine. In one embodiment, the change routine is activated by a communication unit by entry of a two digit code (token number) followed by activating a send button located on the communication unit. Activation of the change routine activates a timer which enters changes into the ISDN environment look-up table based upon receipt of entries before expiration of a time value entered into a change routine timer.

DESCRIPTION OF A PREFERRED EMBODIMENT

Shown generally (10, FIG. 1) is a block diagram of a mobile radio (trunked dispatch) communication system. Included within the communication system is a resource controller (11) interconnected with a memory unit (12), an ISDN interface unit (20), an interconnect

Figure 1:
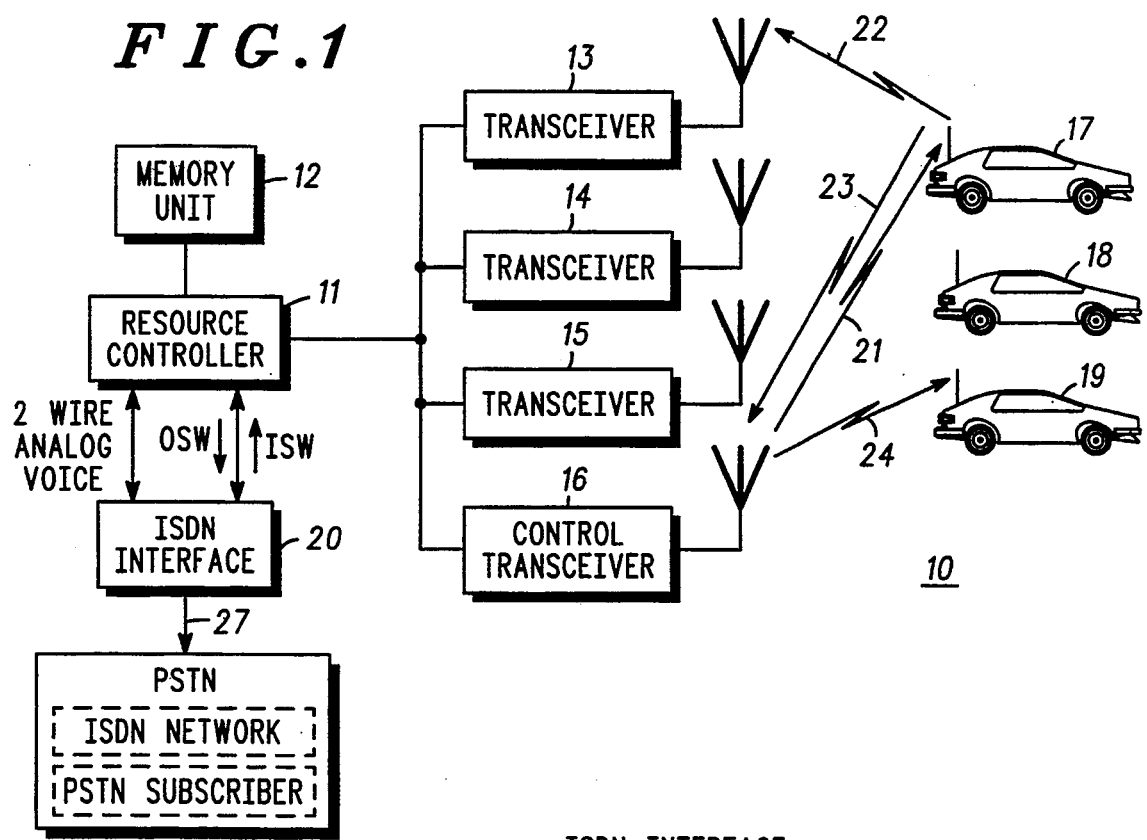
FIG. 1 comprises a block diagram of a trunked communication system with provisions for providing ISDN services.

(27) interconnecting the ISDN interface unit (20) to a PSTN with an ISDN offering ISDN services, transceivers (13, 14, and 15), and a control transceiver (16). Also shown in FIG. 1 are communication units (17, 18, and 19) capable of communicating through transceivers (14-16).

Figure 2:
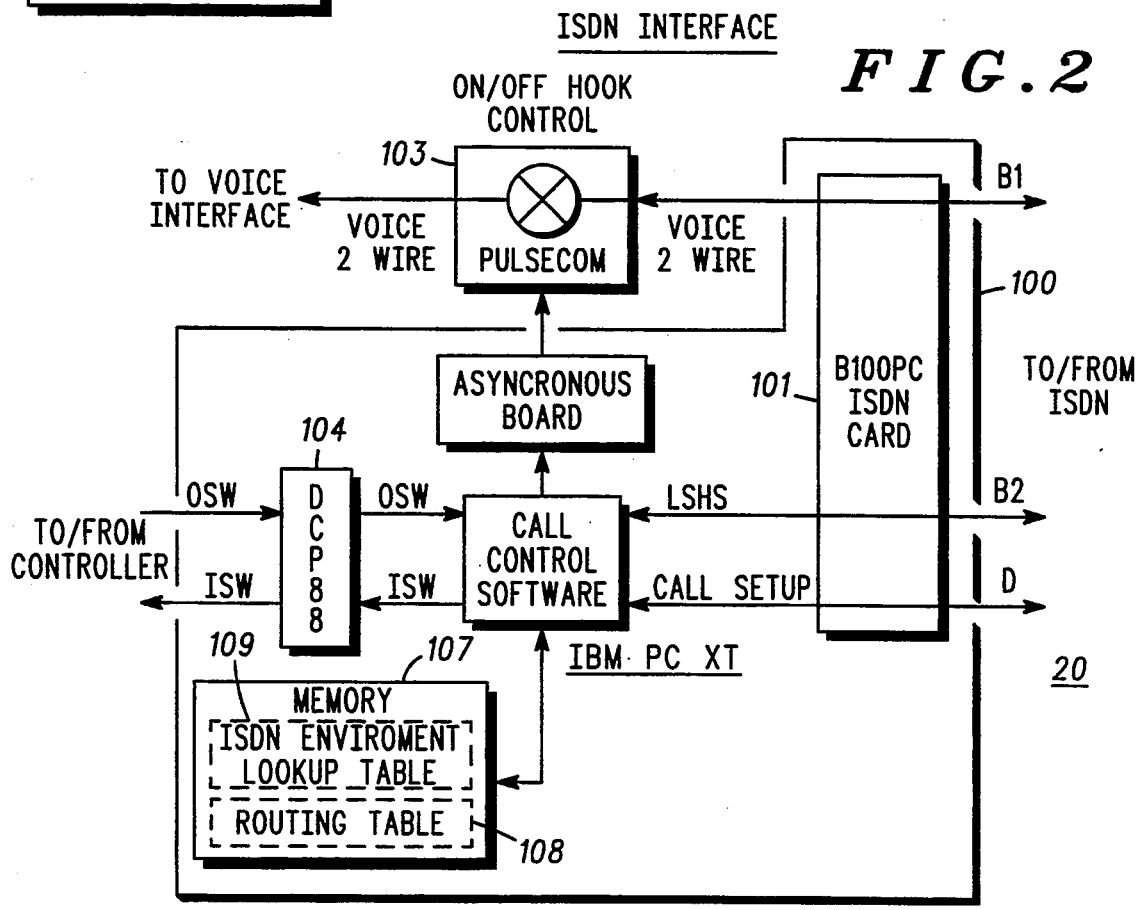
FIG. 2 comprises a block diagram of an ISDN interface.

In one embodiment of the invention, the ISDN interface (20) is constructed as shown in FIG. 2 generally. Control of the ISDN interface is provided by an IBM-PC/XT (100) available from the IBM Corporation. Call control software (CCS) written for the IBM-PC/XT is as shown in Microfiche Appendix. An initialization procedure for start-up of the IBM-PC/XT is required upon activation of the IBM-PC/XT.

Control of the interface between the ISDN interface (20) and the interconnect (27) to the PSTN/ISDN system (FIG. 1) is provided from within the IBM-PC/XT by a model #B100PC ISDN card (101) available from Telcos Communications, Inc., Eatontown, N.J. and installed within the IBM-PC/XT (100).

Figure 3:
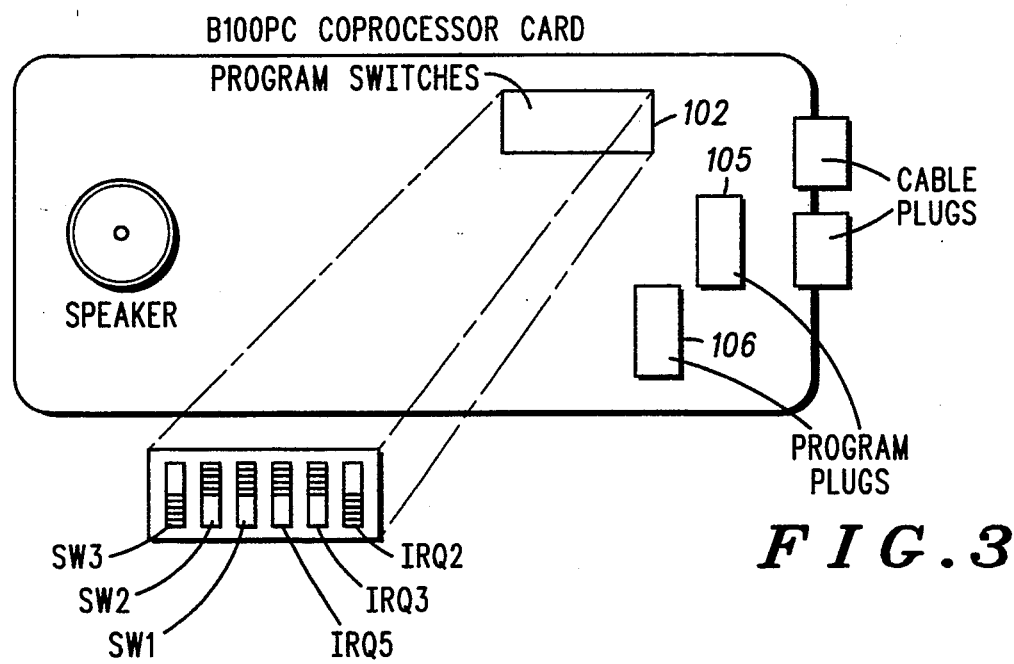
FIG. 3 comprises a B100PC configuration diagram.

The B100PC ISDN card (101, FIG. 2) is configured as shown in FIG. 3. Controlling software for the BP100PC ISDN card (101) is as provided by Telos Communications, Inc. The B100PC card (101) must be configured so that it's hardware interrupt and the start of it's I/O port address do not conflict with the other cards in the IBM-PC/XT (100). The location and settings of the B100PC (101, FIG. 2) I/O Base Address & DIP Switch panel (102, FIG. 3) and programming plugs (105 and 106), are as shown in FIG. 3. The positions of the five programming switches on the DIP switch panel (102) are as follows: the first switch (SW3) must be up, switches two through five (SW2, SW1, IRQ5 and IRQ3) must be down, and switch six (IRQ2) must be down.

The B100PC ISDN card (101) supplied by Telos is designed for use with an audio signal from a PSTN telephone including telephone on/off hook control signals. Such signals are provided by a Pulsecom Voice Coupler (103). The model #1692-31 Pulsecorn Voice Coupler (103) provides the on/off hook control signals required for proper operation of the B100PC ISDN card (101) through use of a reed relay (not shown) controlled from a data ready control terminal of the RS232 port (not shown) on the IBM-PC/XT computer (100). The Pulsetom Voice Coupler (103) provides a voice interface between the resource controller (11, FIG. 1) and the ISDN interface (20, FIG. 1).

Figure 4:
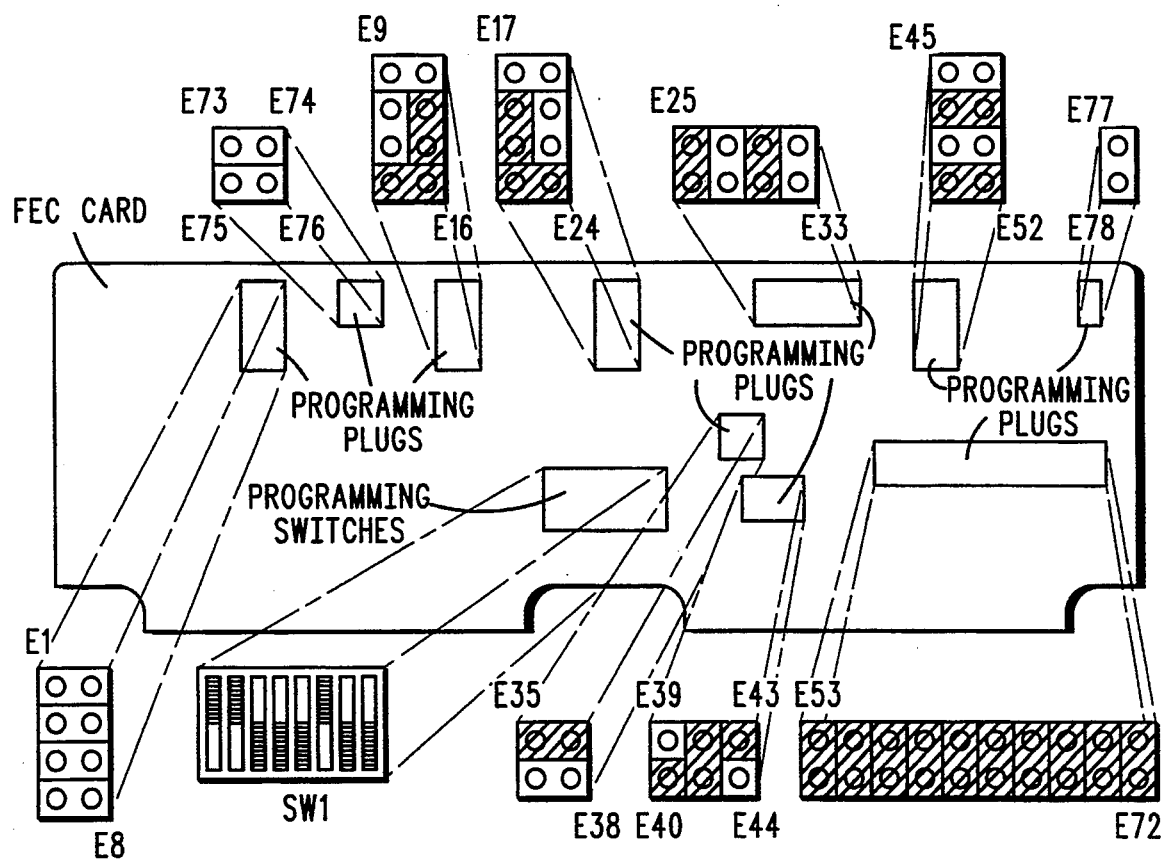
FIG. 4 comprises DCP-88/VM configuration information.

Control signals between the resource controller (11, FIG. 1) and the ISDN interface (20, FIG. 1) are exchanged between a front end coprocessor (FEC) card (104) installed within the IBM-PC/XT (100) and the resource controller (11, FIG. 1). The FEC card (104) is a model #DCP-88/VM Persyst product manufactured by Emulex Corp. of Cosa Mesa, Calif. The FEC card (104) is configured as shown on FIG. 4 and uses software supplied with the FEC card (104).

The FEC card (FIG. 4) must be configured as follows: serial line 1 set for DCE with jumpers in all locations on jumper panel E53-E72 and jumpers in the second and fourth position on jumper panel E45-E52, serial line 2 remains at factory settings with jumpers present in the second and fourth positions of jumper panel E25-E33 and no jumpers on jumper panel E77–E78, serial line 3 remains at factory settings with jumpers present at left-center and bottom of jumper panel E17-E24 and no jumpers on jumper panel E73-E74, serial line 4 remains at factory settings of DTE with a jumper at fight-center and bottom of jumper panel E9–E16 and no jumper on jumper panel E75-E76, parallel printer port with no jumpers on jumper panel E1-E8, switches 1-4 for control register address remain at factory setting of 0x33c with switch 1 and 2 up and switches 3 and 4 down, switches 5-8 for shared memory segment address remain at factory setting of 0xD000 with switches 5,7, and 8 down and switch 6 up, interrupt level set for IRQ5 with a jumper to the fight on jumper panel E39-E43, transparent mode interrupt level set for IRQ4 with a jumper to the left on jumper panel E40-E4, and amount of memory set for 128K with a jumper on the top of jumper panel E35-E38.

Control signals interfacing the resource controller (11) and the FEC card (104) within the IBM-PC/XT (100) are provided by call control software (CCS) (see Microfiche Appendix). Use of the CCS between the resource controller (11) and the FEC (104) within the IBM-PC/XT (100) allows the resource controller (11) to communicate with the ISDN interface (20, FIG. 1) in the same manner as the resource controller (11) would communicate with a trunked console terminal (For an operational description of a trunked console terminal see Motorola publication #68-81063E20, published Sep. 15, 1989).

To impose control by the CCS over the FEC card (104) and the B100PC card (101) an initialization routine must be used in conjunction with the CCS. The B100PC card (101) and FEC card (104) and their related software are initialized each time the IBM-PC/XT (100) is activated. The initialization is accomplished by a one time addition of the following lines to the autoexec.bat file:

path c:\;c:\dos;c:\b100;c:\dcp88
set CM=c:\b100\
netbios −i2 −p1 −ia000 −v5c
bstart
shell −ec:\dcp88\ −fD000 33c 5

The command path c:\;c:\dos;c:\cmd;c:\b100;c:\ adds the directories containing the B100PC and the FEC control commands to the command search algorithm.

The command, set CM=c:\b100\, informs the system where to look for the B100PC files.

The command, bstart, downloads the signalling procedures and activates operation of the B100PC card (101). The command shell, shell −ec:\dcp88\ −fD000 33c 5, acativates the FEC shell program. The options tell the shell to search the c:\dcp88\ directory for the d_exec program, shared memory start address (0xD000), control register address (33c), and interrupt (IRQ5).

Two new directories, c:\b100 and c:\dcp88, were created and the following programs were copies into the directories:
c:\b100\bstart/exe
c:\b100\netbios.exe
c:\b100\v120_1.exe
c:\b100\v120_2.exe
c:\dcp88\d_exec.exe
c:\dcp88\shell.exe.

In general to request service a communication unit (17, FIG. 1) transmits an inbound communication (23)

on a radio frequency channel to the control receiver (16). The inbound communication may contain an ID number of the communication unit (17), a group number, and, upon occasion, auxiliary information such as a request for an interconnect with the PSTN.

Upon receipt of the request for service in the form of an inbound communication (23, FIG. 1) from a communication unit (17) requesting to communicate with another communication unit (19) by the resource controller (11) through the control transceiver (16) the resource controller transmits an outbound signalling word (OSW) (21 and 22) to the requesting communication unit (17) and target unit (19) granting communication resources and identifying the frequency of such resources. The resource controller (11) also, simultaneously, allocates a transceiver (13) to service the communication transaction. The communication unit (17) and target unit (19) upon receiving the OSW (21 and 22) from the resource controller (11) tunes to the allocated frequencies and begins communicating.

Figure 5:
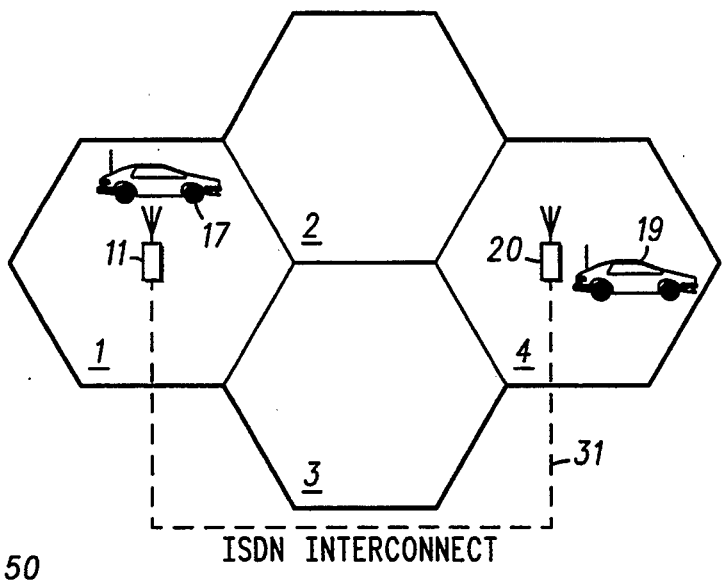
FIG. 5 comprises two cells of a communication system with a requesting communication unit in one cell and a target in another.

Alternately the target communication unit (19) may not be located in the same service coverage area as the requesting communication unit (17). Shown (FIG. 5) is an example of such a situation where the requesting communication unit (17) is located in cell 1 (served by a first communication system (10) generally designated by the reference numbers 25) and the target communication unit (19) is located in cell 4 (served by a second communication system (10) generally designated by the reference number 26). An interface is provided between the resource controllers in cells 1 and 4 in the form of an ISDN communication link (31).

Figure 6:
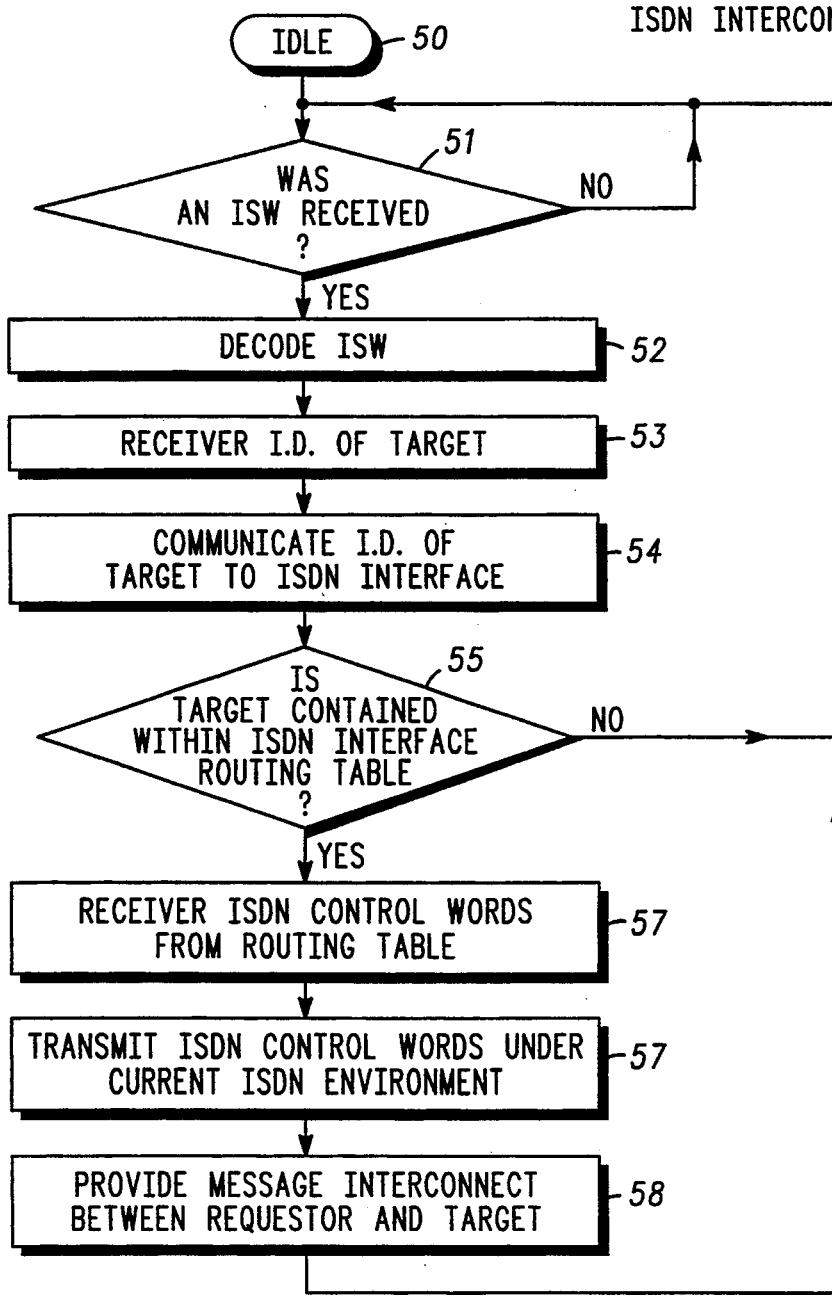
FIG. 6 comprises a flow chart of a method of accessing a target through an ISDN system.

Shown (FIG. 6) is a flow chart reflecting a method allowing access to targets located in other cells through use of an ISDN system. As shown (FIG. 6) all requests for target are processed by an ISDN interface to identify targets (55, FIG. 6) in remote locations. If a target is located in a remote location the control words allowing access to the remote target are recovered (56) from a routing table. The control words are then used to provide access to the remote target.

In a situation involving a remote target (19, FIG. 5) communication unit (17) transmits an inbound communication (23) (51, FIG. 6) as in the previous example. The resource controller (11) as in the previous example receives the request through the control transceiver (16). The resource controller, in response, transmits an OSW (21) granting a resource for use by the requesting communication unit (17). OSWs originating within the resource controller (11) are also communicated to connected trunked console terminals as part of normal call control procedures. Since the ISDN interface (20, FIG. 1) is configured to act as a trunked console terminal the ISDN interface receives the OSW (54, FIG. 6). The OSW (21) is transmitted over a communication link between the resource controller (11) and the FEC (FIG. 2) within the ISDN interface (20).

Contained within the CCS (FIG. 2) and associated memory within the IBM-PC/XT (100) is the location of potential target units (19). In this embodiment of the invention the CCS (FIG. 2) recognizes the OSW (21) as a request for access to a talk group call by the ID of the requested communication group contained within the OSW (21). The ISDN interface (20) refers to memory to locate (55, FIG. 6) target communication units (19) within the talk group located outside the requestor's cell (1, FIG. 5) and completes a connection based, at least in pan, upon an RF message link between the requesting communication unit (17 in cell 1, FIG. 5) and the target communication unit (19 in cell 4).

Entry of locations of target communication units within memory of the ISDN interface may occur through manual entry on start-up of the ISDN interface or through a communication unit's automatic registration of location upon entry into a different cell and through transmission of location back to the home cell followed by subsequent storage of location in the ISDN interface memory.

The locations of target communication units are stored within the ISDN interface memory (107) in the form of a routing table (108). Highest in the hierarchy of the routing table used to locate targets is a group ID number. Next highest are the ID numbers of communication units within particular groups.

In one embodiment of the invention the inbound communication transmitted by a requesting communication unit (17) consists of a two word transmission. The first word of the inbound communication (23) contains the ID of the requesting communication unit (17). The second word of the inbound communication (23) may contain the group ID.

The ISDN interface unit (20) uses the group number and the ID of the requesting communication unit (17) to identify a telephone number through which a target may be accessed from the routing table. The telephone number may be that of an ISDN interface associated with the resource controller of the target cell. The requesting resource controller may then access a target resource controller through the ISDN system and the telephone number listed within the routing table.

The telephone number used to access the target resource controller may also be followed by a reference number used by the ISDN interface (20) located in the target cell (4) to identify the ID of a target communication unit (19) located within the target cell. The target ISDN interface (20) locates the target ID by using a routing table within the target ISDN interface (20). The routing table within the target ISDN interface (20) provides an ID number of the target. The ISDN interface (20) within the target cell (4) uses such target ID number to transmit an inbound communication to a resource controller (11) within the target cell (4) requesting access to the target communication unit (19).

The ISDN interface (20) within the originating cell (1) in requesting access to a target communication unit (19) must transmit, in addition to the target telephone number, setup information into the ISDN network relative to the ISDN calling environment. The ISDN interface (20) accesses such information by recalling from memory ISDN call setup parameters from a look-up table within memory. The ISDN call setup parameters may be the same for all calls, or, may be changed to access different features within the ISDN network. Control of call setup features, in this embodiment, is under control of the CCS within the IBM-PC/XT.

The purpose of the CCS, within the ISDN interface (20), is to monitor the calls and process the call requests, received either from the B100PC (101) or FEC cards (104, FIG. 2). The CCS originates several types of requests to the B100PC card (101) or to the FEC (104) based upon the message received. For example based on the type of OSW received, CCS places either a call origination or a call disconnect request to the B100PC card (101). Upon receipt of a channel grant OSW from the FEC (104), the CCS places a call origination request to the B100PC card (101). The B100PC card (101) sends a SETUP message to the ISDN system within the PSTN network.

Following the SETUP message the originating ISDN interface (20) transmits the telephone number of the target ISDN interface (20). The target ISDN interface in addition to answering the telephone call subsequently uses a transmitted reference number to identify the ID of the target communication unit (19). The target ISDN interface (20) upon identifying the ID of the target communication unit (19) causes an inbound communication to be transmitted to the target resource controller (11) from the target ISDN interface (20) requesting access to the target communication unit (19). Upon receiving a response from the target communication unit (19) the target ISDN interface (20) transmits a CONNECT message back to the originating ISDN interface (20).

Once the B100PC (101) receives the CONNECT message from the ISDN system, it passes control to the CCS. The CCS, in turn, sends an off hook signal to an asynchronous control board which, in turn, sends a signal to the voice coupler (103) through the data ready terminal of the RS232 port. Meantime, the B100PC card (101) opens a message path to the voice coupler (103) and sends a CONNECT ACK message to the ISDN system which ends the call initiation procedure.

Audio is now exchanged between the originating communication unit (17) and target communication unit (19) in a normal manner until such time as the CCS receives an end of call (EOC) from the originating communication unit (17) or a call termination notice from the B100PC card (101). If the CCS receives a EOC from the originating communication unit (17) then the CCS transmits a terminate command to the B100PC card (101). If a terminate command is received from the B100PC card (101) the CCS transmits an EOC to the resource controller (11).

In another embodiment of the invention, the operator may request service by activating a communication unit button labeled "PSTN interconnect". Upon activation of the PSTN interconnect the communication unit (17) transmits an inbound communication containing the ID of the communication unit (17) followed by a group ID number that when communicated to the ISDN interface (20) is interpreted as a request (23) for PSTN service. The resource controller (11) upon receipt of such a request (23) transmits an OSW (21) granting a resource and allocates a transceiver (13) as before. The resource controller then allocates a path between the transceiver (13) and the ISDN interface (20).

Upon accessing the ISDN interface (20) the operator may enter a telephone number on the keypad of the communication unit (17) followed by activation of the send button. Upon receipt of the telephone number the ISDN interface may substitute the telephone number into an area of the routing table reserved for accessing PSTN subscribers under an ISDN environment. In such a case the telephone number becomes a part of the access code used by the ISDN interface. The ISDN interface may then execute the call under a then-current ISDN environment.

After obtaining access to the ISDN interface, on the other hand, the operator may enter a request for modified ISDN services by accessing a call setup change routine program within the ISDN interface. The operator enters such request by entering a, for example, two digit number (token number) on the keypad on his communication unit (17) followed by the send button. Upon pressing the send button the communication unit (17) transmits an inbound communication (22) containing the token to the transceiver (13). The resource controller (11) receives the inbound communication (22) through the transceiver (13) and communicates the token word to the ISDN interface (20). The ISDN interface (20) upon receiving the token word executes the call setup change routine program and allows subsequent changes to the ISDN environment look-up table (109). The operator may then make such changes by entering characters and numbers on the keypad of the communication unit (17).

Entry to the call setup change routine starts a timer from within the routine. Changes to the call setup table must be entered before expiration of a time entered into the timer. If the operator completes entry of changes and terminates the routine before expiration of the time period the changes are stored in a look-up table within the ISDN interface. Upon completing changes to the ISDN environment the operator terminates such routine by the entry of a second token number.

In one embodiment of the invention the operator may also build his own unique look-up table for specific calling environments by entering a single digit token following entry to the call setup change routine. The unique calling environment may be later accessed by entering the identical single digit token before entering the target ID number or telephone number.

In another embodiment of the invention control words specifying an ISDN environment are generated by an ISDN environment control program within the ISDN interface (20). The ISDN environment control program may generate specific environments in response to token words specifying an environment during call initiation.

In another embodiment of the invention the ISDN interface is integrated into the resource controller (11). Integration of the ISDN interface into the resource controller would reduce data traffic between peripheral support devices at a resource controller base site. The integration of an ISDN interface into the resource controller may occur in the form of software additions (modem) and a hardware addition in the nature of a ISDN controller card similar to the B100PC card. In such a case the resource controller would execute interconnects directly upon receipt of inbound communications requesting such services through the use of subroutines (CCS) and the modem within the communication system resource controller.

We claim:

1. In a mobile radio communication system having a resource controller with an ISDN interface and an interconnect interconnecting the ISDN interface to a PSTN with an ISDN offering ISDN services, and at least one communication unit requesting communication services involving ISDN services, a method of providing the communication services to the requesting communication unit, such method comprising the steps of:

A) transmitting an inbound communication on a radio frequency channel from the communication unit to the resource controller requesting access to a communication target;
   B) receiving and decoding the inbound communication to identify the target;
   C) communicating target identity to the ISDN interface;

D) determining, upon occasion, whether an access code of the target is listed in a routing table within a memory operatively coupled to the ISDN interface;

E) recovering the access code from the routing table and a set of control words associated with the requesting communication unit specifying an ISDN environment from the memory; and, F) transmitting by the ISDN interface the access code and the set of control words to the ISDN.

2. The method as in claim 1 wherein communicating target identity further comprises identifying the communication target as a talk-group.

3. The method as in claim 1 wherein communicating target identity further comprises identifying the target identity as a telephone number of a PSTN subscriber.

4. The method as in claim 1 wherein the ISDN interface comprises a subroutine and modem within the communication system resource controller.

5. An ISDN access system for a communication unit through a communication system ISDN interface and an interconnect with a PSTN with an ISDN, where such ISDN access system comprises:

A) at least one requesting communication unit requiring access to a target;

B) means for transmitting by the requesting communication unit an inbound communication on a radio frequency channel containing an ID of the target;

C) means for receiving and decoding the inbound communication by a resource controller within the communication system to identify the target;

D) means for communicating target identity information to the ISDN interface;

E) memory means operatively coupled to the ISDN interface containing a routing table for, upon occasion, identifying an access code for the target and a set of control words associated with the requesting communication unit for specifying an ISDN environment; and F) transmitter means for transmitting the access code and the set of control words to the ISDN.

6. The system as in claim 5 wherein the ISDN interface comprises a subroutine and modem within the communication system resource controller.

7. In a mobile radio communication system having a resource controller, a ISDN interface operatively coupled to a memory, and at least one communication unit requesting ISDN services through a communication system ISDN interface, a method of modifying an ISDN environment look-up table within the memory based on inbound communications transmitted from the communication unit, such method comprising the steps of:

A) transmitting by the communication unit an inbound communication on a radio frequency channel requesting access to a target;

B) receiving and decoding the inbound communication from the communication unit by the resource controller to produce a token number;

C) communicating the token number to the ISDN interface;

D) determining by reference to a routing table that the token is a request for access to a ISDN environment look-up table change routine; and E) making entries within the ISDN look-up table based on inbound communication received and decoded by the resource controller from the communication unit and upon an identifier of the communication unit.

8. The method as in claim 7 further including the step of locating the ISDN interface within the communication system resource controller.

9. An ISDN access system allowing access to communication units within a mobile radio communication system under an ISDN environment from a PSTN subscriber within a PSTN system through an ISDN interface within the communication system, such ISDN access system comprising:

A) means for receiving at least one ISDN control word from the PSTN subscriber at the ISDN interface;

B) means for decoding the at least one ISDN control word within the ISDN interface to produce at least one ID of a target communication unit;

C) means for locating the at least one target communication unit within the communication system by reference to a memory operably coupled to the ISDN interface;

D) means for communicating to a communication system resource controller a request for communication access to the at least one target communication unit based at least in part upon the ID and location of the at least one target communication unit;

E) means for receiving notification at the ISDN interface of a grant of communication access from the resource controller in response to the request communicated to the resource controller through the means for communicating; and F) means for providing a message connection between the at least one target communication unit and the requesting PSTN subscriber.

10. The system as in claim 9 wherein the ISDN interface comprises a subroutine and modem within the communication system resource controller.

11. In a cellular communication system, a method of providing ISDN services to a requesting communication unit, such method comprising the steps of: receiving, at a base site of the cellular system from the requesting communication unit, an access request including an identity of the requesting communication unit and an identity of a communication target; recovering an access code and a set of control words of an ISDN environment from a memory of the base site based upon the identity of the requesting communication unit; and, communicating the access code and set of control words to an ISDN network through an ISDN interconnect.

* * * * *